United States Patent
Benzi

[11] Patent Number: 5,895,323
[45] Date of Patent: Apr. 20, 1999

[54] DEVICE FOR THE PROTECTION OF A TRANSMISSION JOINT IN AGRICULTURAL VEHICLES

[75] Inventor: Vito Carlo Benzi, Meda-Inzago, Italy

[73] Assignee: Benzi & Di Terlizzi S. R. L., Inzago, Italy

[21] Appl. No.: 09/050,096

[22] Filed: Mar. 30, 1998

Related U.S. Application Data

[63] Continuation of application No. 08/831,346, Apr. 1, 1997, abandoned.

[30] Foreign Application Priority Data

Apr. 17, 1996 [IT] Italy .................. MI96A0734

[51] Int. Cl.$^6$ ........................................ F16C 1/26
[52] U.S. Cl. ............... 464/173; 464/175; 464/178; 74/609
[58] Field of Search .................. 464/170, 172, 464/174, 175, 178, 173; 74/608, 609

[56] References Cited

U.S. PATENT DOCUMENTS

| | | | |
|---|---|---|---|
| 1,167,695 | 1/1916 | Huff | 464/175 |
| 3,053,062 | 9/1962 | Geisthoff | 464/175 |
| 3,104,536 | 9/1963 | Walterscheid-Muller | 464/175 |
| 3,498,082 | 3/1970 | Geisthoff et al. | 464/178 |
| 3,703,089 | 11/1972 | Geisthoff et al. | 464/175 |
| 3,795,118 | 3/1974 | Kesl et al. | 464/175 |
| 4,157,019 | 6/1979 | von Allworden | 464/175 |
| 4,478,592 | 10/1984 | Krude et al. | 464/175 |
| 5,046,990 | 9/1991 | Mikeska et al. | 464/175 |
| 5,169,358 | 12/1992 | Bondioli | 74/609 |

FOREIGN PATENT DOCUMENTS

| | | | |
|---|---|---|---|
| 62-288727 | 12/1987 | Japan | 464/170 |
| 2-89819 | 3/1990 | Japan | 464/175 |
| 2 079 885 | 1/1982 | United Kingdom | 464/175 |

Primary Examiner—Eileen Dunn Lillis
Attorney, Agent, or Firm—Young & Thompson

[57] ABSTRACT

A protection device for a wide-angle transmission joint includes a first casing with a proximal end fixed to a ring sliding into a groove in a disc and a distal end bearing an extension inwardly folded. The casing has a first part covering the intermediate means as well as the zone which connects the latter with the yoke and a second part covering the yoke as well as the end of the transmission shaft. The connection between the two parts is realized by a section which is deformable under the action of the transmission shaft inclining when the joint is bent up to 80°.

13 Claims, 1 Drawing Sheet

1

DEVICE FOR THE PROTECTION OF A TRANSMISSION JOINT IN AGRICULTURAL VEHICLES

CROSS-REFERENCE TO RELATED APPLICATIONS

This application is a continuation of application Ser. No. 08/831,346, filed Apr. 1, 1997 now abandoned.

TECHNICAL FIELD

The present invention concerns a device for the protection of a transmission joint in agricultural vehicles, more especially for a homokinetic joint that is known in the field as "wide-angle joint" and allows the transmission shaft to be inclined up to an angle of about 80° compared to the motor-shaft or the drive-shaft.

The field of the invention is that of transmission means for agricultural vehicles and the related protection devices of the transmission means as a whole, and especially of the joints for such means. This field is subject to the European standards EN 1151, EN 292 and EN 294 that prescribe operating tests and safety criteria and for this reason the sale of these transmissions means is subject to the issuance of certificates by competent authorities.

BACKGROUND ART

The prior art comprises:

i) a so-called "non integral protection", or open protection, in which a single casing body protects the perimeter of the joint, but leaves an opening through which a foreign body may reach rotating parts (see for example the European Patent n° 0 154 216 held by the same applicant). If one considers that the foreign body might be a person's hand, it is clear why such a protection is dangerous. This form of protection is fitted into a perimetral groove of the disc between the two yokes of the coupling where it is held in position by chainlets, and is a conical piece with the greater aperture facing the transmission shaft so that there are no problems when the shaft inclines, for example when the tractor goes round a bend.

ii) a so-called "semi-closed petal protection" comprising a main casing that covers the whole joint around the perimeter and an auxiliary casing that covers the end of the transmission shaft that connects to the joint. The space between the two casings, set at a certain distance from one another, allows relative movements between the same casings when the transmission shaft inclines and is closed by a series of plastic "petals" that have their external margins fastened within the main casing and their internal margins loose, but touching the auxiliary casing. This solution offers a certain amount of protection and the possibility of high inclinations of the transmission shaft, but has its main drawback in the fact that, because the "petals" are elastic, they may bend even under a weak pressure allowing a foreign body to reach the rotating parts of the transmission means.

DISCLOSURE OF INVENTION

In the following description we shall define as—proximal connection means—or also—proximal yoke—the joint means connected to the motor shaft or to the drive-shaft (these shall both conventionally be defined as—motion shaft—); as—distal connection means—or also—distal yoke—the joint means connected to the transmission shaft; as—disc—or—intermediate means—the means that connects the two previously named connection means. Furthermore, the term—casing(s)—is intended as the part or parts of the protection device that, fastened around the joint in a certain way, is of tubular, cylindrical, conical or funnel shape, in order to continuously cover the entire perimeter of the joint or part of it and is conveniently spaced from it. Generally, these casings are conveniently made of deformable plastic materials or mixes of natural or synthetic rubbers.

It is understood that the device may be suited to protecting both the motion shafts. Therefore we shall term—proximal end—that of any part connected to the motion shaft and—distal end—that of any part adjacent the transmission shaft.

The invention overcomes the above stated drawbacks and, as characterized in the claims, is a protection device comprising: a) a first casing that has its proximal end conventionally fixed to a ring slidingly engaged in a groove of the device central means and the distal end bears an extension folded inwards, up to the adjacency of the distal connection means, said casing has a first part that covers the central means and the connections between the central zone and the distal connection means and a second part that covers the distal connection means and the related end of the transmission shaft, the connection between said two parts being realized by means of a section that is able to elastically deform under the action of the transmission shaft that inclines compared to the motion shaft so that the second part inclines compared to the first part; b) a second casing, fixed to a ring slidingly engaged in a groove of the distal connecting means, that extends from outside towards the inside of the first casing, adjacent to the inside wall of the latter; c) a third casing, fixed to the perimeter of the proximal end of the first casing, in order to perimetrally cover the part of the proximal connection means connected to the intermediate means.

The main advantage of the invention is that it offers a complete and safe protection against the accidental or intentional entry of a foreign body in the joint zone; the first casing effectively prevents the entry of a foreign body especially in the region of the connection between the intermediate connection means and the distal connection means, that is the most dangerous, while the second casing cooperates with the extension folded inwards from the second end of the first casing to effectively prevent the entry of a foreign body in the region in which the distal connection means is connected to the end of the transmission shaft.

BRIEF DESCRIPTION OF DRAWING

The invention is explained in detail below with an example of embodiment and with reference to the attached drawings, in which.

BEST MODE FOR CARYING OUT THE INVENTION

Figure 1:
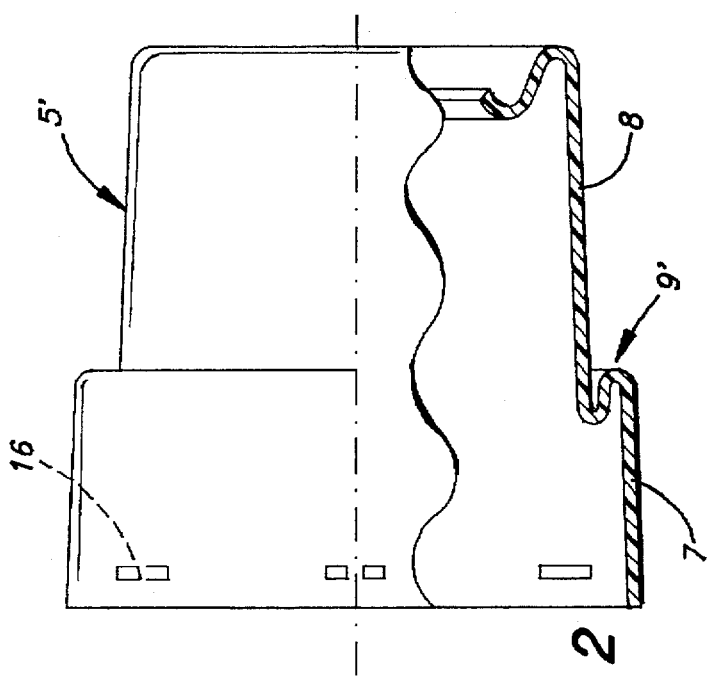
FIG. 1 is a longitudinal unit view partly sectioned.

FIG. 1 shows: the proximal yoke 1, solid with the motor shaft, not shown, connected to disc 2 and the distal yoke 3 solid to the transmission shaft 4 and a first casing 5 fixed to the ring 6 engaged so as to slide within a perimetral groove of the disc 2. this casing 5 is in a single piece and bears a first part 7 that covers disc 2 essentially up to the zone where the latter is connected to the distal yoke 3 and bears a second part 8 that covers the remaining part of the distal yoke 3 and the zone in which the latter connects to the transmission shaft 4. The connection between parts 7 and 8 of casing 5 is realized with a deformable Z shaped section 9 that allows the part 8 to incline compared to part 7 when the distal yoke 3 and the transmission shaft 4 incline compared to the motor shaft. Extension 10 of casing 5 is folded towards the inside and towards the proximal part of the casing in order to collaborate with a second casing 11 that is fixed to a ring 12 slidingly engaged in a groove of the dital yoke 3 and that is extended into the first casing ending with a radial extension 13 so that, even if a foreign body should pass the obstacle set by extension 10, the second casing with its extension 13 will avoid any contact with rotating parts. Another purpose of the second casing 11 is to afford an adequate engagement seat to the pipe 15 that protects the transmission shaft 4 along its entire length. A third casing 14 is fixed to the external perimeter of the proximal end of the first casing in order to protect the connection zone between the proximal yoke 1 and disc 2.

Figure 2:
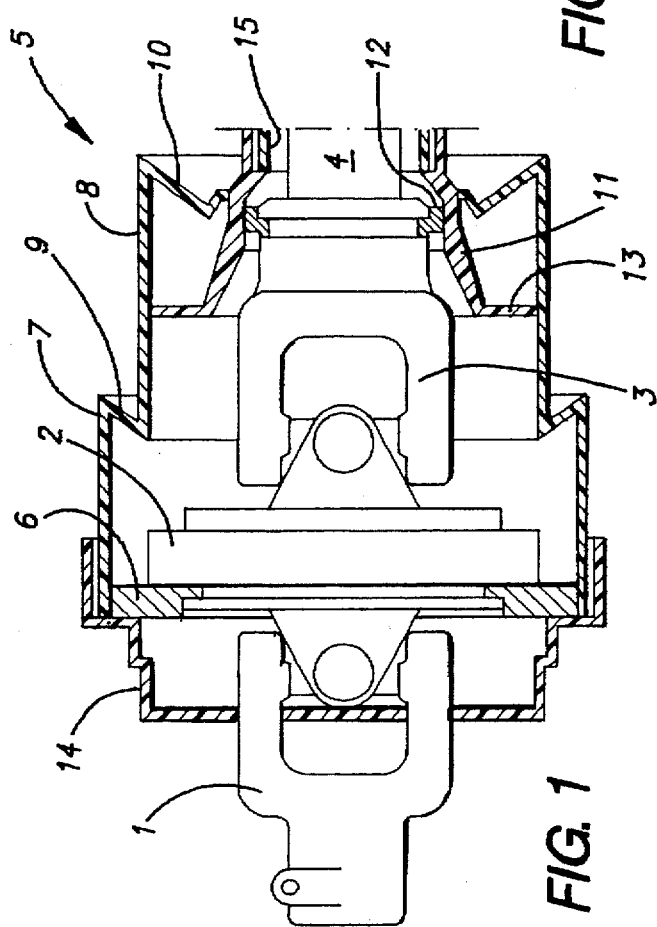
FIG. 2 is a first partly sectioned longitudinal view.

FIG. 2 shows another way to realize deformable section 9'. Casing 5' is a single piece of conveniently elastic plastic material. The deformable section has an S shape especially suited to the purpose. The apertures 16 on the proximal end of the casing serve to engage the latter on the ring 6, by means of appropriate extensions, not shown, so that the latter bears in correspondance with the same apertures.

Figure 3:
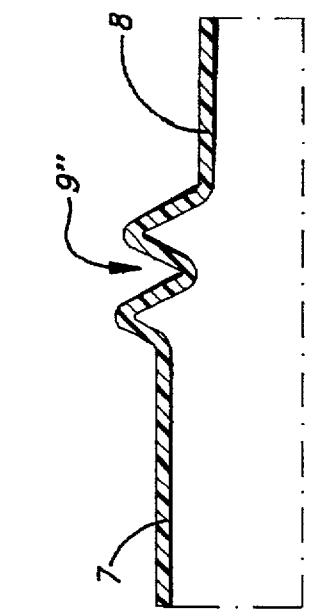
FIG. 3 is a second partly sectioned longitudinal view.

FIG. 3 shows a part of the upper half of a casing 5" in one piece in order to illustrate yet another way to realize said deformable section 4" shaped like bellows.

Figure 4:
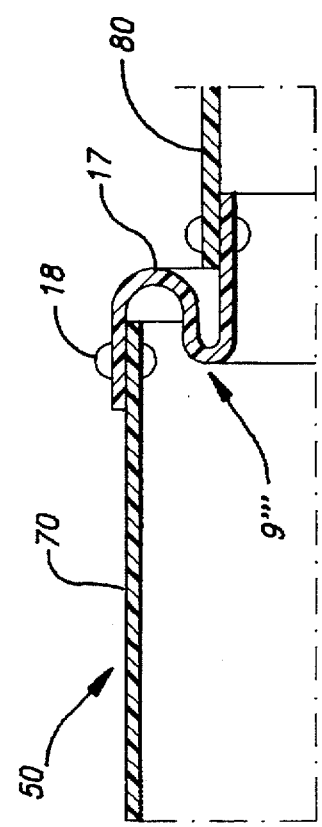
FIG. 4 is a third partly sectioned longitudinal view.

FIG. 4 shows part of the upper half of a casing 50 in order to illustrate yet another way to realize a deformable section 9'" with a connecting element between the two parts 70 and 80 of the casing that is realized in two parts. These parts are joined by the pre-formed Neoprene S-shaped deformable section 17 fixed to their perimeter by means of rivets 18.

I claim:

1. A device for protecting a wide-angle transmission joint that has an intermediate member connecting a distal yoke of a transmission shaft and a proximal yoke of a motion shaft, the device comprising:

a first casing comprising a first part for covering the intermediate member and a second part for covering the distal yoke, said first part having a proximal end for being affixed to the intermediate member, said second part for being movable with the transmission shaft and having a distal end with a folded extension that is folded inwardly to narrow an opening at said distal end, said first and second parts being joined with a deformable section for permitting movement of said second part relative to said first part so that an angle between respective axes of said proximal end and said distal end is the same as an angle between respective axes of the intermediate member and the transmission shaft;

a second casing at least partially inside said second part for closing said opening, said second casing comprising a proximal extension that is folded outwardly to be adjacent an inner surface of said first casing and a distal extension for placement adjacent the transmission shaft, said folded extension of said second part of said first casing being adjacent an outer surface of said distal extension of said second casing; and a third casing for peripherally covering the proximal yoke and being fixed to an outer surface of said first part of said first casing.

2. The device of claim 1, wherein said first casing consists of a single piece and wherein said deformable section comprises a portion of said single piece that is folded at least twice to form a zig-zag.

3. The device of claim 1, wherein said first part and said second part are separate pieces and wherein said deformable section comprises a separate deformable member affixed to both said first and second parts.

4. The device of claim 1, wherein said deformable section permits relative movement of said second part so as to accommodate an angle between the motion shaft and the transmission shaft of up to 80°.

5. The device of claim 1, wherein said proximal extension of said second casing is adjacent said inner surface of said first casing at approximately midway of an axial length of said second part of said first casing.

6. The device of claim 1, wherein said folded extension of said second part of said first casing is folded more than 90° back inside an inner surface of said second part of said first casing.

7. A device for protecting a wide-angle transmission joint that has an intermediate member connecting a distal yoke of a transmission shaft and proximal yoke of a motion shaft, the device comprising:

a first casing comprising a first part for covering the intermediate member and a second part for covering the distal yoke, said first part having a proximal end for being affixed to the intermediate member, said second part for being movable with the transmission shaft and having a distal end with a folded extension that is folded more than 90° inwardly and inside an inner surface of said second part to narrow an opening at said distal end, said first and second parts being joined with a deformable section for permitting movement of said second part relative to said first part; and a second casing at least partially inside said second part for closing said opening, said second casing comprising a proximal extension that is extended outwardly to be adjacent an inner surface of said second part of said first casing for separating said second part from the distal yoke when respective axes of the transmission shaft and the intermediate member are not aligned, said second casing further comprising a distal extension for placement adjacent the transmission shaft, said folded extension of said second part of said first casing being adjacent an outer surface of said distal extension of said second casing.

8. The device of claim 7, wherein said first casing consists of a single piece and wherein said deformable section comprises a portion of said single piece that is folded at least twice to form a zig-zag.

9. The device of claim 7, wherein said first part and said second part are separate pieces and wherein said deformable section comprises a separate deformable member affixed to both said first and second parts.

10. The device of claim 7, wherein said deformable section permits relative movement of said second part so as to accommodate an angle between the motion shaft and the transmission shaft of up to 80°.

11. The device of claim 7, wherein said proximal extension of said second casing is adjacent said inner surface of said first casing at approximately midway of an axial length of said second part of said first casing.

12. A device for protecting a wide-angle transmission joint, the device comprising:

a first casing comprising a first part for covering a first portion of the joint and a second part for covering a second portion of the joint and that is movable relative to the first portion of the joint, said first part having a proximal end for being affixed to the first portion of the joint, said second part for being movable with the second portion of the joint and having a distal end with a folded extension that is folded back inside an inner surface of said second part to narrow an opening at said distal end, said first and second parts being joined with a deformable section for permitting movement of said second part relative to said first part, wherein said deformable section permits relative movement of said second part so as to accommodate an angle between the first and second portions of the joint of up to 80°; and a second casing at least partially inside said second part for closing said opening, said second casing comprising a proximal extension that is extended radially outwardly to be adjacent an inner surface of said second part of said first casing for separating said second part from the second portion of the joint when the device is bent, said second casing further comprising a distal extension for placement adjacent the second portion of the joint, said folded extension of said second part of said first casing being adjacent an outer surface of said distal extension of said second casing.

13. The device of claim 12, wherein said proximal extension of said second casing is adjacent said inner surface of said first casing at approximately midway of an axial length of said second part of said first casing.

* * * * *